(12) United States Patent
Raman et al.

(10) Patent No.: US 10,114,630 B2
(45) Date of Patent: Oct. 30, 2018

(54) MANAGEMENT OF SOFTWARE AND OPERATING SYSTEM UPDATES REQUIRED FOR THE PROCESS OF CREATING A VIRTUAL MACHINE FACSIMILE OF AN EXISTING PHYSICAL OR VIRTUAL MACHINE

(75) Inventors: Venkatasubrahmanyan Raman, Seattle, WA (US); Natalya V. Varava, Bellevue, WA (US); Sergey Royt, Bellevue, WA (US); Robert M. Fries, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 13/570,114

(22) Filed: Aug. 8, 2012

(65) Prior Publication Data

US 2012/0304163 A1  Nov. 29, 2012

Related U.S. Application Data

(63) Continuation of application No. 11/871,628, filed on Oct. 12, 2007, now Pat. No. 8,245,217.

(51) Int. Cl.
*G06F 9/44* (2018.01)
*G06F 8/65* (2018.01)
*G06F 9/455* (2018.01)

(52) U.S. Cl.
CPC ............ *G06F 8/65* (2013.01); *G06F 9/45533* (2013.01)

(58) Field of Classification Search
CPC ............................ G06F 8/65; G06F 9/45533
(Continued)

(56) References Cited

U.S. PATENT DOCUMENTS 5,257,376 A   10/1993   Beck et al.
5,845,077 A   12/1998   Fawcett
(Continued)

FOREIGN PATENT DOCUMENTS

EP    1211596 A1    6/2002
JP    2002-007129 A    1/2002
(Continued)

OTHER PUBLICATIONS

Attardi et al. "Heterogeneous Distributed Computing in Practice", 1993, HP European Users Conference.*
(Continued)

*Primary Examiner* — Wei Zhen
*Assistant Examiner* — Junchun Wu
(74) *Attorney, Agent, or Firm* — Baker & Hostetler LLP

(57) ABSTRACT

Disclosed are techniques for using known update technologies to automatically identify the updates installed on a physical machine prior to facsimile creation, to locate the update packages from an update server, and to download them to the machine performing the facsimile creation. The use of update technologies enables precise identification of the updates that affect the defined set of files requiring replacement, and thus minimizes the number of updates that need to be downloaded. In addition, the desired set of replacement files are extracted and cached to allow for their reuse during subsequent facsimile creations using either the same or different physical or virtual machine as the source. Downloading the minimal set of updates and caching them for reuse eliminates the redundant downloads of updates and results in a shorter time for facsimile creation.

20 Claims, 3 Drawing Sheets

(58) Field of Classification Search
USPC .......................................................... 717/170
See application file for complete search history.

(56) References Cited

U.S. PATENT DOCUMENTS

| | | | |
|---|---|---|---|
| 6,360,366 B1* | 3/2002 | Heath | G06F 8/65 |
| | | | 717/178 |
| 6,405,219 B2 | 6/2002 | Saether et al. | |
| 6,557,089 B1* | 4/2003 | Reed | G06F 11/1458 |
| | | | 711/162 |
| 6,704,933 B1* | 3/2004 | Tanaka | G06F 8/60 |
| | | | 717/170 |
| 6,732,244 B2 | 5/2004 | Ashton | G06F 11/1458 |
| | | | 711/162 |
| 6,772,302 B1* | 8/2004 | Thompson | G06F 3/0617 |
| | | | 711/162 |
| 6,981,250 B1 | 12/2005 | Wiltamuth et al. | |
| 6,996,682 B1* | 2/2006 | Milligan | G06F 3/0619 |
| | | | 711/154 |
| 7,089,547 B2* | 8/2006 | Goodman | G06F 8/65 |
| | | | 717/170 |
| 7,155,710 B2 | 12/2006 | Breckner et al. | |
| 7,216,251 B2 | 5/2007 | Gaunt et al. | |
| 7,216,343 B2 | 5/2007 | Das et al. | |
| 7,246,351 B2 | 7/2007 | Bloch et al. | |
| 7,433,899 B2* | 10/2008 | Pearson | G06F 11/1448 |
| 7,484,223 B2 | 1/2009 | Hill et al. | |
| 7,536,585 B1* | 5/2009 | Keeton | G06F 11/008 |
| | | | 714/33 |
| 7,574,481 B2 | 8/2009 | Moore et al. | |
| 7,653,794 B2 | 1/2010 | Michael et al. | |
| 8,209,680 B1* | 6/2012 | Le | G06F 17/30067 |
| | | | 717/174 |
| 8,245,217 B2* | 8/2012 | Raman | G06F 8/65 |
| | | | 717/170 |
| 2002/0188935 A1 | 12/2002 | Hertling et al. | |
| 2004/0064812 A1 | 4/2004 | Tachiyama | |
| 2004/0172574 A1 | 9/2004 | Wing et al. | |
| 2005/0125513 A1 | 6/2005 | Sin-Ling Lam et al. | |
| 2005/0160418 A1 | 7/2005 | Jeong et al. | |
| 2005/0177829 A1* | 8/2005 | Vishwanath | G06F 8/61 |
| | | | 717/177 |
| 2005/0268054 A1* | 12/2005 | Werner | G06F 11/2069 |
| | | | 711/162 |
| 2006/0010176 A1 | 1/2006 | Armington | |
| 2006/0089995 A1 | 4/2006 | Kerr et al. | |
| 2006/0155735 A1 | 7/2006 | Traut et al. | |
| 2006/0174074 A1* | 8/2006 | Banikazemi | G06F 3/0608 |
| | | | 711/162 |
| 2006/0184937 A1 | 8/2006 | Abels et al. | |
| 2006/0218544 A1 | 9/2006 | Chakraborty et al. | |
| 2006/0225065 A1 | 10/2006 | Chandhok et al. | |
| 2006/0294516 A1 | 12/2006 | Winner et al. | |
| 2007/0006225 A1 | 1/2007 | McCalister et al. | |
| 2007/0033588 A1* | 2/2007 | Landsman | G06F 17/30899 |
| | | | 717/178 |
| 2007/0088762 A1 | 4/2007 | Harris et al. | |
| 2007/0162521 A1 | 7/2007 | Raghunath | |
| 2007/0169025 A1 | 7/2007 | Moore et al. | |
| 2007/0244700 A1 | 10/2007 | Kahn et al. | |
| 2007/0261045 A1 | 11/2007 | Gujarathi et al. | |
| 2008/0189572 A1* | 8/2008 | McBride | G06F 11/2094 |
| | | | 711/162 |
| 2008/0301660 A1* | 12/2008 | Rao | G06F 8/65 |
| | | | 717/170 |
| 2009/0007105 A1* | 1/2009 | Fries | G06F 8/65 |
| | | | 718/1 |
| 2009/0019436 A1 | 1/2009 | Hartz et al. | |
| 2012/0218424 A1* | 8/2012 | Gotoh et al. | 348/207.1 |
| 2014/0033194 A1* | 1/2014 | Natchadalingam | G06F 8/65 |
| | | | 717/173 |

FOREIGN PATENT DOCUMENTS

| | | |
|---|---|---|
| JP | 2008-084029 A | 4/2008 |
| WO | WO 2006/023169 A1 | 3/2006 |
| WO | WO 2007/048062 | 4/2007 |

OTHER PUBLICATIONS

Liu et al. "Live Migration of Virtual Machine Based on Full System Trace and Replay", 2009, ACM.*

Rashid et al. "Machine-Independent Virtual Memory Management for Paged Uniprocessor and Multiprocessor—Architectures", 1998, IEEE, vol. 37, No. 8.*

Rosenblum et al. "Monitors: Current Technology and Future Trends", May 2005, IEEE.*

Syogo Nakajima, "Do you know for sure? Windows 2000/XP's basic, Network vol. 5 Why can access be made securely to the Internet?" Nikkei Windows for IT Professionals, No. 83, pp. 74, Nikkei Business Publication, Inc., Japan, Feb. 1, 2004.

Notice of Rejection issued for Japanese Patent Application No. 2010-528983, dated Nov. 30, 2012, 6 pages.

Chandra, R. et al., "The Collective: A Cache-Based System Management Architecture", NSDI, 2005, Technical Paper, http://www.usenix.org/event, 18 pages.

Chen et al., "Update-Based Cache Access and Replacement in Wireless Data Access", IEEE, Dec. 2006.

International Patent Application No. PCT/US2008/079119: International Search Report and Written Opinion dated Apr. 30, 2009, 11 pages.

Machida et al., "Adaptive Monitoring for Virtual Machine Based Reconfigurable Enterprise Systems", IEEE, 2007.

Yu, Y. et al., "A Feather-weight Virtual Machine for Windows Applications", VEE, 2006, 24-34, http://delivery.acm.org.

"Office Action Received for European Patent Application No. 08837457.4", dated Aug. 26, 2014, 4 Pages.

"Office Action Issued in European Patent Application No. 08837457.4", dated Feb. 16, 2017, 6 Pages.

* cited by examiner

MANAGEMENT OF SOFTWARE AND OPERATING SYSTEM UPDATES REQUIRED FOR THE PROCESS OF CREATING A VIRTUAL MACHINE FACSIMILE OF AN EXISTING PHYSICAL OR VIRTUAL MACHINE

CROSS REFERENCE TO RELATED APPLICATIONS

This application is a continuation of U.S. patent application Ser. No. 11/871,628 filed on Oct. 12, 2007, the entire contents are incorporated herein by reference.

BACKGROUND

Physical and virtual machines over their lifetime have their operating systems and applications periodically upgraded by the installation of patches and updates. Examples of such patches and updates include, but are not limited to, service packs, hot fixes, fixes for security issues, and fixes for bugs in the installed versions of the software. Such updates sometimes affect the files in the defined set that need to be replaced during the creation of a virtual machine facsimile of the physical machine. Consequently, it may be critical to identify the updates that affected each file in the defined set of files in order to locate the correct version of the corresponding replacement file.

Once the relevant set of updates has been identified, the updates need to be downloaded from a repository of updates and examined to locate the replacement files. The appropriate replacement files need to be copied onto the virtual machine facsimile. Such a download and replacement process needs to be performed during every virtual machine facsimile creation.

Current solutions for the replacement problem typically address it using a manual process to identify and download the relevant updates, and by building customized scripts to find and replace the affected files in the facsimile. Such a process requires a trial and error approach, as well as user intervention, to keep the scripts current as new updates are released for the operating system and the applications. This can be a tedious and repetitive task as new updates may be released frequently. Changing the replacement scripts often imposes an additional test burden to ensure that they continue to operate correctly.

SUMMARY

Existing update technologies may be employed to automatically identify the updates installed on a physical machine prior to facsimile creation, to locate the update packages from an update server, and to download them to the machine performing the facsimile creation. The use of such update technologies enables precise identification of the updates that affect the defined set of files requiring replacement, and thus may minimize the number of updates that need to be downloaded. Additionally, the desired set of replacement files may be extracted and cached to allow for their reuse during subsequent facsimile creations using either the same or a different physical or virtual machine as the source. Downloading a minimal set of updates and caching them for reuse may eliminate redundant downloads of updates and may result in a shorter time for facsimile creation.

DETAILED DESCRIPTION OF ILLUSTRATIVE EMBODIMENTS

Figure 1:
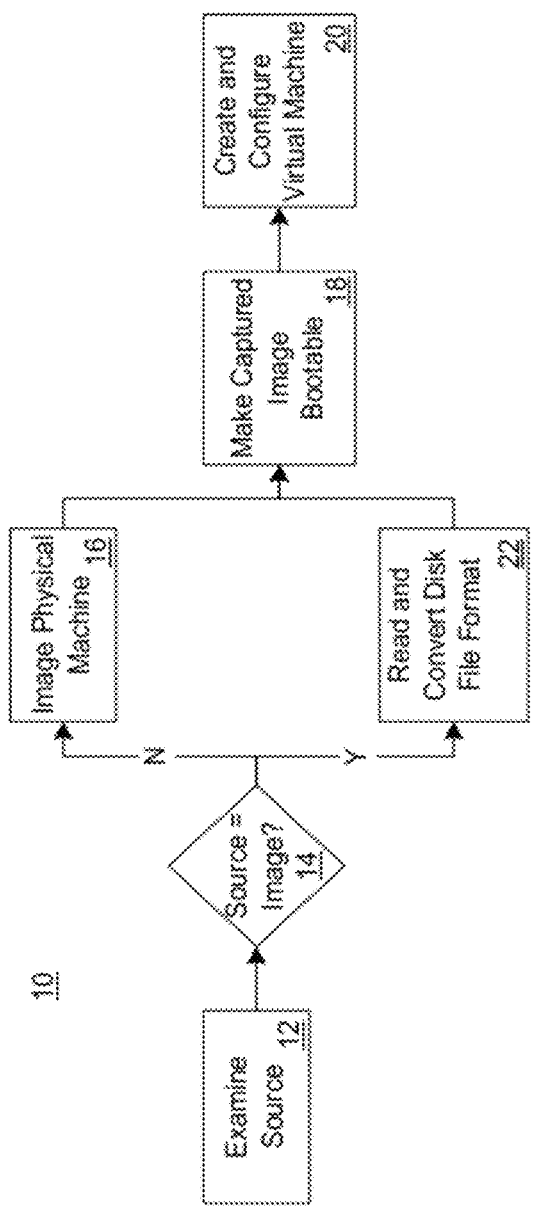
FIG. 1 is a flowchart of a process for creating a virtual machine facsimile.

FIG. 1 is a flowchart of a process 10 for creating a virtual machine facsimile. A virtual machine facsimile may be created from a "source," which may be a physical machine, a virtual machine that is currently running, or a pre-existing image (e.g., a virtual machine that is not currently running or a backup of a machine).

At 12, the source may be examined to ascertain its hardware and software profiles. As used herein, the term "profile" may refer to a set of hardware and/or software characteristics. For example, the source may be examined to determine the version of the operating system installed on it, as well as the versions of any system or application software installed on it. The source may be examined to identify any software patches or updates that may have been installed. The source hardware may be examined to determine how much memory and processing power (a.k.a., "CPU") the source has, how many network cards it has, what networks it may be connected to, the number, types, and sizes of disks it has, etc.

If the source is a pre-existing image, then the source may be represented by files on a data storage medium, rather than a running machine. Accordingly, the virtual machine configuration may be examined to ascertain the hardware and software profiles.

If the source is a physical machine or a virtual machine that is currently running, then the physical machine may be examined to ascertain its hardware and software profiles. As part of examining the source, at 12, update technologies may be employed to detect updates that may be currently installed on the physical or virtual machine for which the facsimile is being created. As used herein, the term "updates" includes software patches. The term "update technologies" refers to the use of an "update manager" for version control of certain "managed" software components.

Figure 2:
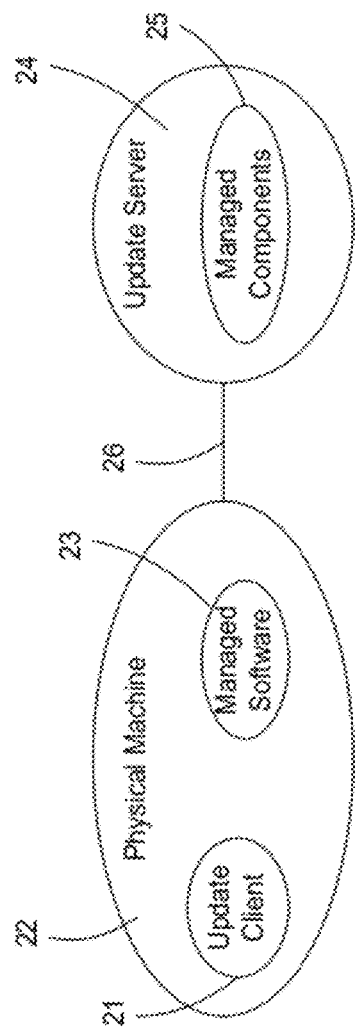
FIG. 2 depicts an example update manager system.

FIG. 2 depicts an example update manager system 20. The update client 21 accesses the machine 22 that includes the managed software 23, i.e., the software the version of which the update manager 20 endeavors to keep current. Typically, the update client 21 will reside and run on the machine 22 on which the managed software 23 is installed.

The update server 24 keeps track of the most current versions of any number of managed software components 25. The update server 24 is typically remote from the machine 22 on which the managed software 23 resides (i.e., the client machine). The update server 24 and the client machine 22 are typically interconnected via a network 26, such as the Internet. Examples of such an update server may include a Windows Update Server (WSUS) or a Microsoft Systems Management Server (SMS).

Figure 3:
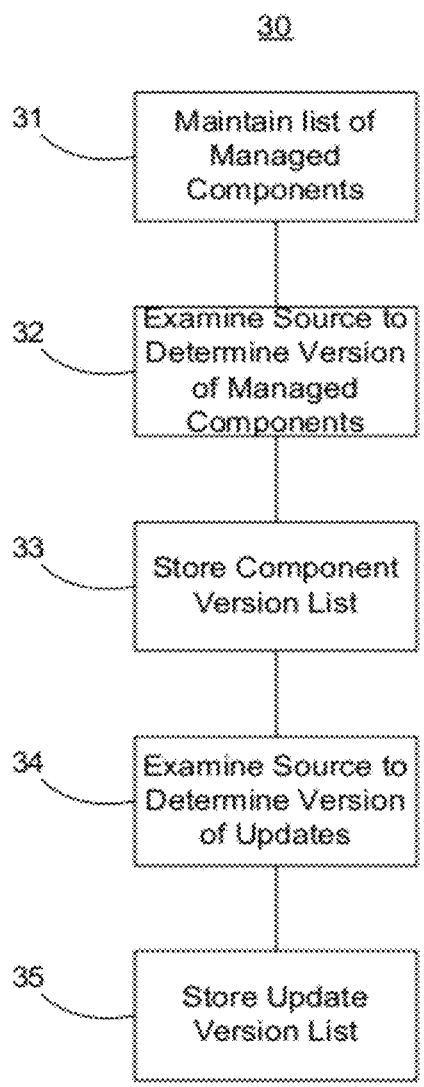
FIG. 3 is a flowchart of a process for using update technologies to determine whether the updates or patches installed on a source machine need to be replaced during facsimile creation.

FIG. 3 depicts a method 30 for using update technologies to detect updates as part of examining a source (at 12 in FIG. 1). As shown in FIG. 3, an update client may be employed to examine the source to determine which versions of certain managed components the source includes. So that it may "know" which components are managed components, the update client may, at 31, maintain a list of managed components. Any or all of the software components residing on a source may be managed components.

At 32, the update client may examine the source to determine which version of each managed component the source currently includes. At 33, the update client may store (e.g., in memory on the source machine) the list of managed components and a version associated with each.

At 34, the update client may examine the source to determine whether any updates have been applied to any of the managed components. If so, at 35, the update client may store an update identifier (e.g., version number) associated with the update and the managed component to which the update was applied.

Thus, an update client may be employed to examine the source to identify the most-current versions of certain managed software components installed on the source, including the most-current versions of any updates (including patches) that may be installed on the source. As will be described below, the use of update technologies to identify the updates currently installed on the source may reduce the number of files that need to be downloaded to make the captured image bootable.

Description of a process for creating a virtual machine facsimile now continues with reference once again to FIG. 1. After the source is examined at 12, the source may be "imaged." How the source is imaged may depend on whether the source, itself, is an image. An "image" may be considered a set of files that replicate the contents (e.g., the hardware and software profiles) of a physical machine.

If, at 14, it is determined that the source is an image, then, at 22, the source may be imaged by reading the set of files that form the image, and converting the format of any such files, if necessary, to generate a set of files in a desired file format.

If, at 14, it is determined that the source is not merely an image, and, therefore that the source is either a physical machine or a virtual machine that is currently running, then, at 16, the physical machine may be imaged. In this case, where the machine to be imaged is a virtual machine that is currently running, the term "physical machine to be imaged" may refer to the physical machine that the virtual machine emulates. Techniques for imaging a physical machine are well-known. Examples of such techniques are described and claimed in U.S. patent application Ser. No. 11/430,676, filed May 8, 2006, the disclosure of which is hereby incorporated herein by reference.

At 18, the captured image may be made "bootable." That is, the image captured at 14 or 22 may be made compatible with the configuration emulated by the virtual server software that will be used to "run" the facsimile.

Figure 4:
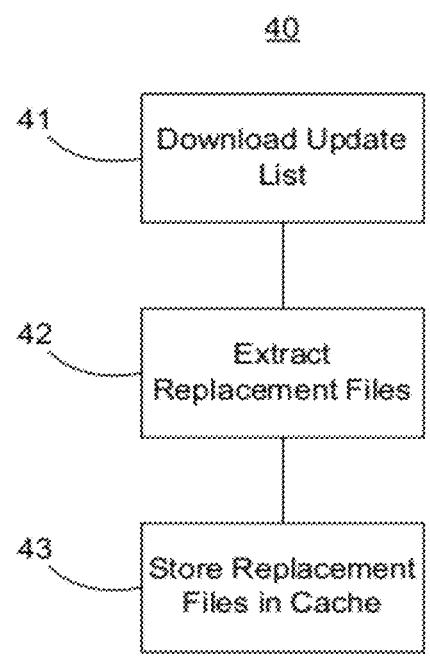
FIG. 4 is a flowchart of a process for storing extracted replacement files in a cache to be reused during future facsimile creation.

FIG. 4 is a flowchart of an example process 40 for making a captured image bootable. At 41, the minimal list of updates (identified at 12 in FIG. 1) may be downloaded from the update server to the machine performing the facsimile creation process. Update technologies may be used to query, locate, and download the list of updates.

The updates may be examined, at 42, to extract appropriate replacement files for each of the files that need to be replaced or added. These files may then be used to perform the replacement and render the virtual machine facsimile operational. It should be understood, of course, that existing files may be replaced, or new files added/installed (e.g., drivers for emulated devices). At 43, the extracted replacement files may be stored in a cache on the machine performing the facsimile creation process to be reused during future facsimile creation. This is an optimization that tends to ensure that each update is downloaded only once. Once all the required updates have been added to the cache, future facsimile creations can proceed without requiring any downloads.

With reference again to FIG. 1, the virtual machine may be created and configured at 20. That is, the hard disks defined by the file set that forms the captured image may be logically assembled to form the virtual machine. The hard disks may be logically connected to one another, and the virtual machine may be started running. Thus, software and operating system update technologies may be employed for the process of creating a virtual machine facsimile of an existing physical or virtual machine.

Exemplary Computing Arrangement

Figure 5:
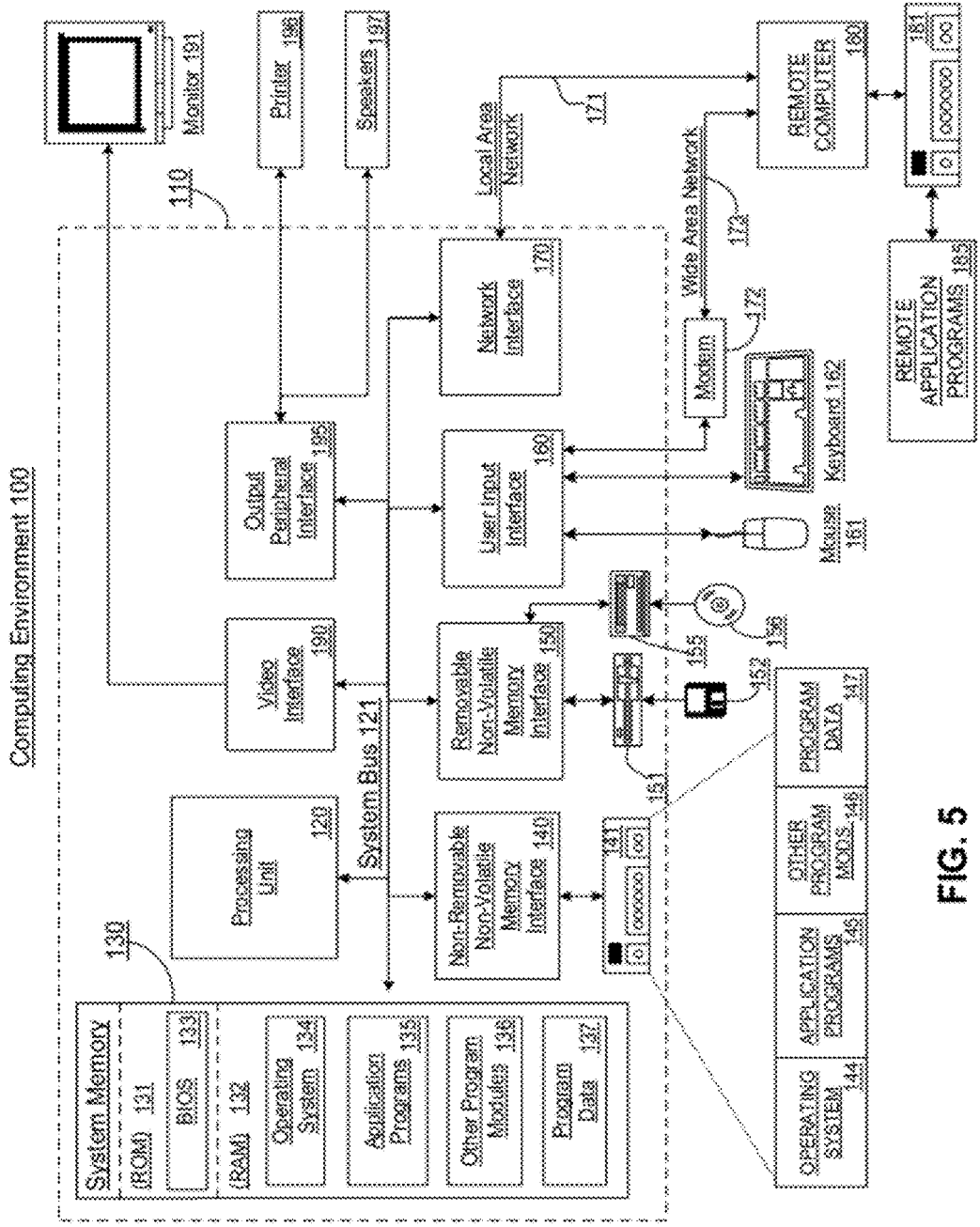
FIG. 5 is a block diagram of an example computing environment in which example embodiments and aspects may be implemented.

FIG. 5 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 5 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5, provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 5. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for creating a virtual copy of a source machine, the method comprising:

imaging the source machine to create an image of the source machine, the image comprising a file corresponding to a file of the source machine;
checking the source machine to determine a first version of an update installed on the source machine, the update being associated with a software component installed on the source machine;
determining a second version of the update, the second version being a newer version than the first version;
checking the file comprised in the image and determining that the corresponding file of the source machine was affected by the update, wherein determining that the corresponding file of the source machine was affected by the update comprises examining a software profile of the source machine;
replacing the file comprised in the image with a newer file associated with the second version of the update, wherein replacing the file is based at least in part on the determination that the corresponding file of the source machine was affected by the update;
storing the newer file in a cache on the source machine; and
extracting the newer file from the cache for reuse during a future virtual copy creation;
wherein the steps of determining, replacing, storing, and extracting eliminate redundant downloads of the update and reduce a time of the virtual copy creation.

2. The method of claim 1, further comprising maintaining a list of managed components, wherein the list of managed components comprises the software component.

3. The method of claim 2, wherein checking the source machine to determine a first version of an update installed on the source machine comprises checking a software profile of the source machine to determine one or more updates applied to one or more of the managed components based on the list of managed components.

4. The method of claim 3, further comprising storing one or more update identifiers associated with the one or more determined updates and the one or more managed components.

5. The method of claim 2, further comprising checking the source machine to determine a version of the software component based on the list of managed components.

6. The method of claim 5, further comprising storing the list of managed components and the determined version of the software component.

7. The method of claim 1, wherein the source machine is a physical machine, and wherein imaging the source machine comprises determining parameters of the physical machine, wherein the parameters comprise: memory type, processing power, disk size, number of network cards, and type of connected networks.

8. The method of claim 1, wherein the source machine is a virtual machine, and wherein imaging the source machine comprises determining hardware and software profiles of the virtual machine.

9. The method of claim 1, wherein the source machine is an image, and wherein imaging the source machine comprises converting files comprised in a software profile of the source machine from a first file format to a second file format.

10. The method of claim 1, further comprising storing the newer file on a storage device associated with a second machine.

11. The method of claim 1, further comprising converting the image to a format compatible with an image format executable on a second machine.

12. A system for creating a facsimile of a machine, comprising:
a processor; and
a memory communicatively coupled to the processor when the system is operational, the memory bearing processor instructions that, when executed on the processor, cause the system to at least:
image the machine to create an image of the machine, the image comprising a set of at least one file corresponding to at least one file of the machine;
check the machine to determine a first version of an update installed on the machine, the update being associated with software installed on the machine;
determine a second version of the update, the second version being an updated version of the first version;
check a file comprised in the set of at least one file of the image and determine that a corresponding file of the machine was affected by the update, wherein the instructions to determine that the corresponding file of the source machine was affected by the update comprise instructions to examine a software profile of the source machine;
replace the file comprised in the set with a newer file associated with the second version of the update, wherein replacing the file is based at least in part on the determination that the corresponding file of the machine was affected by the update;
store the newer file in a cache on the source machine; and
extract the newer file from the cache for reuse during a future virtual copy creation;
wherein the determining, replacing, storing, and extracting eliminate redundant downloads of the update and reduce a time of the virtual copy creation.

13. The system of claim 12, further comprising processor instructions stored in the memory that, when executed on the processor, cause the system to boot the image on a physical machine.

14. The system of claim 13, wherein the image is booted as a virtual machine by assembling a plurality of virtual hard disks, wherein each of the virtual hard disks is defined by a respective set of files, and wherein at least one of the hard disks is defined by at least the newer file.

15. The system of claim 12, further comprising processor instructions stored in the memory that, when executed on the processor, cause the system to:
determine whether the software is comprised on a software list managed by the system; and
receive a version of the software from a server connected to the system over a network, the received version being a newer version than a version of the software installed on the machine.

16. The system of claim 12, further comprising processor instructions stored in the memory that, when executed on the processor, cause the system to:
determine whether the software is comprised on a software list managed by the system;
receive the second version of the update from a server connected to the system over a network; and
store, on a memory associated with the system, an update identifier associated with the second version of the update.

17. The system of claim 12, further comprising processor instructions stored in the memory that, when executed on the processor, cause the system to:
download the newer file from a server connected to the system over a network; and store the downloaded file in cache associated with the system.

18. A non-transitory computer readable storage device having stored thereon instructions that when executed by a processor cause the processor to execute a virtual copy of a source machine, the instructions comprising instructions to:
retrieve an image of the source machine, the image comprising a file corresponding to a file of the source machine;
receive from a remote device a second version of a software update, the software update corresponding to an update to the software installed on the source machine, the second version being an updated version of a first version of the update installed on the source machine;
determine that the corresponding file in the source machine was affected by the update to the software installed on the source machine, wherein the instructions to determine that the corresponding file of the source machine was affected by the update comprise instructions to examine a software profile of the source machine;
retrieve a replacement file associated with the second version of the software update;
replace the file comprised in the image with the replacement file, wherein replacing the file is based at least in part on the determination that the corresponding file of the source machine was affected by the update;
store the replacement file in a cache on the source machine; and
extract the replacement file from the cache for reuse during a future virtual copy creation; and
run the updated image as a virtual machine;
wherein determining, replacing, storing, and extracting eliminate redundant downloads of the update and reduce a time of the virtual copy creation.

19. The non-transitory computer readable storage device of claim 18 further comprising instructions to store the updated image on a memory associated with a machine running the virtual machine.

20. The non-transitory computer readable storage device of claim 18, wherein the replacement file is retrieved from cache associated with a machine running the virtual machine.

* * * * *